United States Patent [19]

Rowe

[11] Patent Number: 4,492,875
[45] Date of Patent: Jan. 8, 1985

[54] WAVE POWERED BUOY GENERATOR
[75] Inventor: Raymond A. Rowe, Encinitas, Calif.
[73] Assignee: The United States of America as represented by the Secretary of the Navy, Washington, D.C.
[21] Appl. No.: 446,284
[22] Filed: Dec. 2, 1982
[51] Int. Cl.³ ............................................. F03B 13/12
[52] U.S. Cl. ........................................ 290/53; 290/44; 310/273
[58] Field of Search ................... 290/42, 53; 335/280; 310/15, 36, 38, 273; 322/100; 60/499, 501

[56] References Cited

U.S. PATENT DOCUMENTS 3,066,203  11/1962  Ovshinsky ........................ 310/15
4,110,630   8/1978  Hendel ............................. 290/42

FOREIGN PATENT DOCUMENTS 197801  1/1978  U.S.S.R. ............................ 310/36

Primary Examiner—J. V. Truhe
Assistant Examiner—Shelley Wade
Attorney, Agent, or Firm—Robert F. Beers; Ervin F. Johnston; Thomas Glenn Keough

[57]  ABSTRACT

The wave powered buoy generator includes a hollow buoy which has inner and outer surfaces. The buoy is preferably spherical in shape. One or more windings are mounted to the buoy parallel to its surfaces with each winding having a pair of ends. A magnetized device which, is preferably a ball, is located within the buoy for rolling back and forth therein. A device is connected to the ends of the windings for rectifying current flow therefrom. With this arrangement the buoy can be moored in a body of water, and, when there is water motion, the flux lines of the magnetized roller device cut the one or more windings so as to cause electrical current flow to be provided through the rectifying device.

18 Claims, 12 Drawing Figures

WAVE POWERED BUOY GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a wave powered buoy generator which can be tethered to the ocean bottom and left unattended for long periods of time to produce electrical current.

Many oceanographic devices are stationed for long periods of time in the ocean for monitoring various ocean conditions, such as temperature, acoustics, or current. Some of the oceanographic devices collect and store the data while others transmit the data to remote locations. Most devices are stationed at a fixed location, such as resting on the ocean bottom or tethered from the ocean bottom to some distance thereabove.

The abovementioned oceanographic devices require a source of electrical power. Various provisions for such power are energy storage devices, self contained power supplies; or power from a ship, submarine, or shore based by a generating source, electrical generator. For some applications a better method would be to place the electrical generator in the ocean with the oceanographic equipment for direct use or with the energy storage device for indirect use by the oceanographic device. A wave powered buoy generator, designed to be placed in the ocean, would reliably produce electric current whenever there was wave motion, and can operate for extended periods of time without any maintenance.

SUMMARY OF THE INVENTION

The present invention is an improved wave powered buoy generator which maximizes the electrical current output from wave motion in ocean waters. This has been accomplished by providing a hollow buoy which has inner and outer surfaces. One or more windings are mounted to the buoy parallel to its surfaces with each winding having a pair of ends. It is preferable that the buoy be spherical and that the windings be embedded in the wall of the buoy along great circles thereof. A magnetized device, which is preferably a ball, is located within the buoy for rolling back and forth therein. A device is connected to the ends of each winding for rectifying the current flow therefrom as the ball rolls around in the buoy due to wave action. With this arrangement the buoy can be moored in the ocean and the wave motion will cause the flux lines of the magnetized ball to cut the windings and cause electrical current to be provided for powering oceanographic equipment or charging an energy storage device.

OBJECTS OF THE INVENTION

An object of the invention is to provide a wave powered buoy generator which maximizes current output due to wave motion.

Another object is to provide a wave powered buoy generator which can be moored for long periods of time with no maintenance.

A further object is to provide a wave powered buoy generator which is easy to construct, operable for extended periods of time without maintenance, and which maximizes current output from wave motion.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
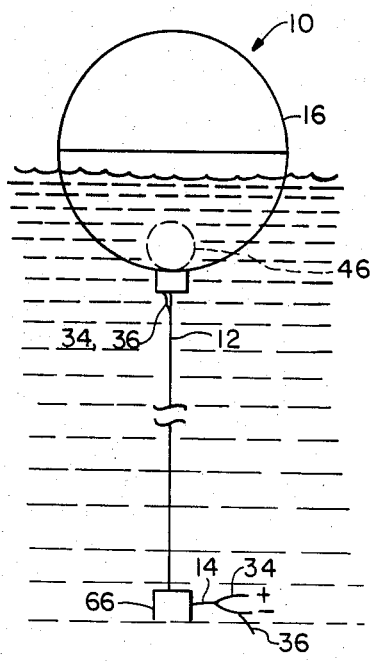
FIGS. 1, 2, and 3 are ocean elevational views of a moored wave powered buoy generator in various positions due to wave motion.
Figure 2:
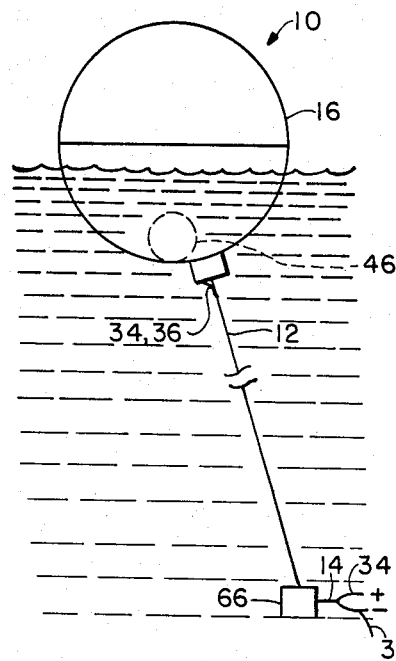
Figure 3:
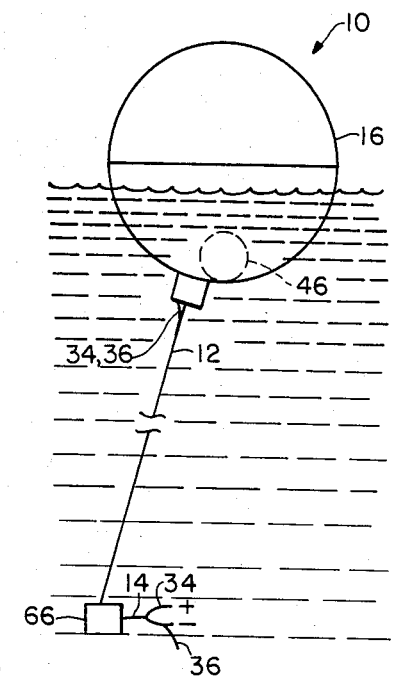
Figure 4:
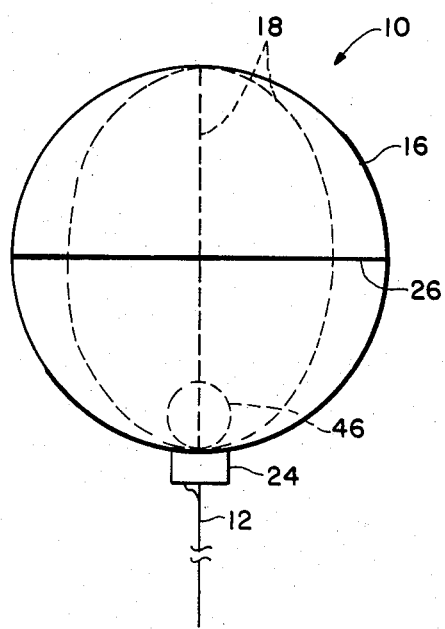
FIG. 4 is a side view of one embodiment of the wave powered buoy generator.
Figure 5:
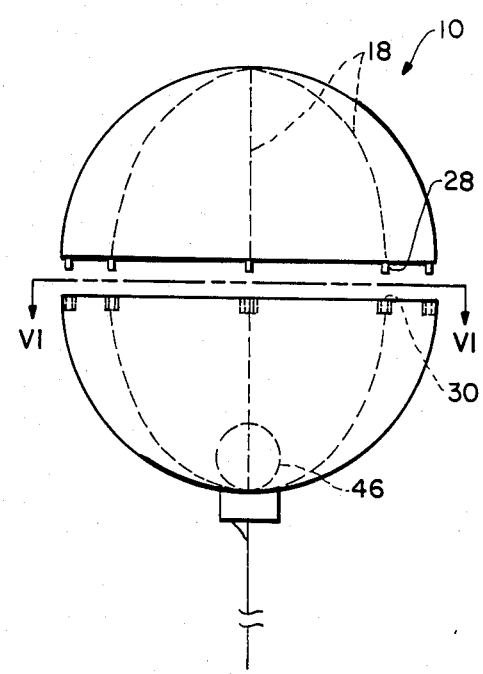
FIG. 5 is the same as FIG. 4 except the buoy is shown in a separated open position.
Figure 6:
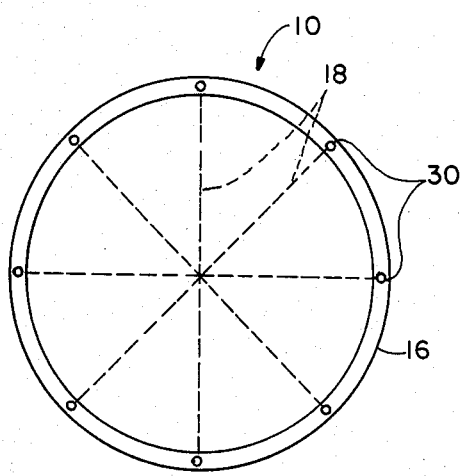
FIG. 6 is a view taken along plane VI—VI of FIG. 5.

In FIGS. 4 through 6 there is illustrated one embodiment 10 of the wave powered buoy generator. FIGS. 1 through 3 illustrate the wave powered buoy generator 10 being moved back and forth due to wave action. The wave powered buoy generator 10 may be tethered to the bottom of the ocean by a cable 12. When the buoy generator is moved by the wave action an electrical current will be generated and available via a cable 14 for recharging an energy storage device (not shown) which may in turn be utilized for operating oceanographic equipment (not shown).

Figure 7:
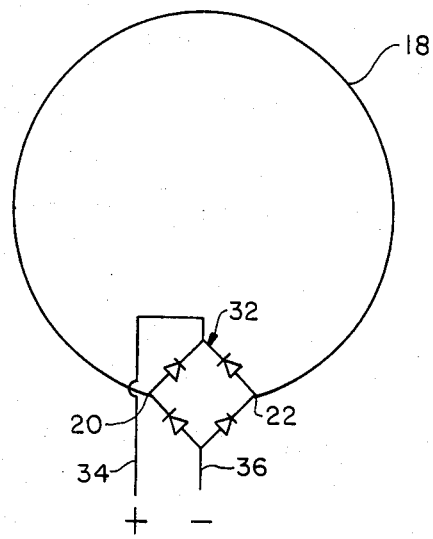
FIG. 7 is a schematic illustration of one of the windings connected to a rectifier device.

As illustrated in FIG. 4 the wave powered buoy generator 10 may include a hollow buoy 16 which is preferably spherical. A plurality of windings 18 are mounted to the buoy parallel to its inner and outer surfaces. As illustrated in FIG. 7, each of the windings 18 has a pair of ends 20 and 22. The windings 18 are located along great circles of the sphere and may be wrapped around the outside of the sphere or located on the inside of the sphere with an epoxy coating holding them in place. The preferred way of mounting the windings to the spherical buoy 16 is by embedding them within the wall of the spherical buoy, as shown in FIGS. 4, 5, and 6. This can be accomplished by constructing the spherical buoy of plastic, such as acrylic and curing the resin in a mold which includes the windings positioned along great circles of the sphere.

In the embodiment shown in FIGS. 4, 5, and 6 the windings 18 lie within vertical planes which include the vertical axis of the spherical buoy. In this embodiment the windings 18 cross at the top of the spherical buoy and the ends of the windings 20 and 22 are located at the bottom of the spherical buoy where they exit the buoy and enter into a junction box 24 which will be described in more detail hereinafter.

In order to open the spherical buoy 16 the sphere is split at 26 into hemispheres between the sphere's top and bottom. As illustrated in FIGS. 5 and 6 male and female connectors 28 and 30 may be provided for making connection of the windings when the hemispheres are assembled. It is to be understood that the hemispheres may be any other suitable means for connecting the windings when the hemispheres are placed together to form the spherical buoy. Also, when the hemispheres are assembled a ring of epoxy or cement should be placed around the split 26 so as to seal the interior of the spherical buoy from seawater intrusion. This seal can be simply ground off when it is desired to once again open the spherical buoy. It should be noted that the embodiment in FIGS. 4, 5, and 6 only has one set of windings which are all oriented within vertical planes through the top and bottom poles of the sphere.

Figure 10:
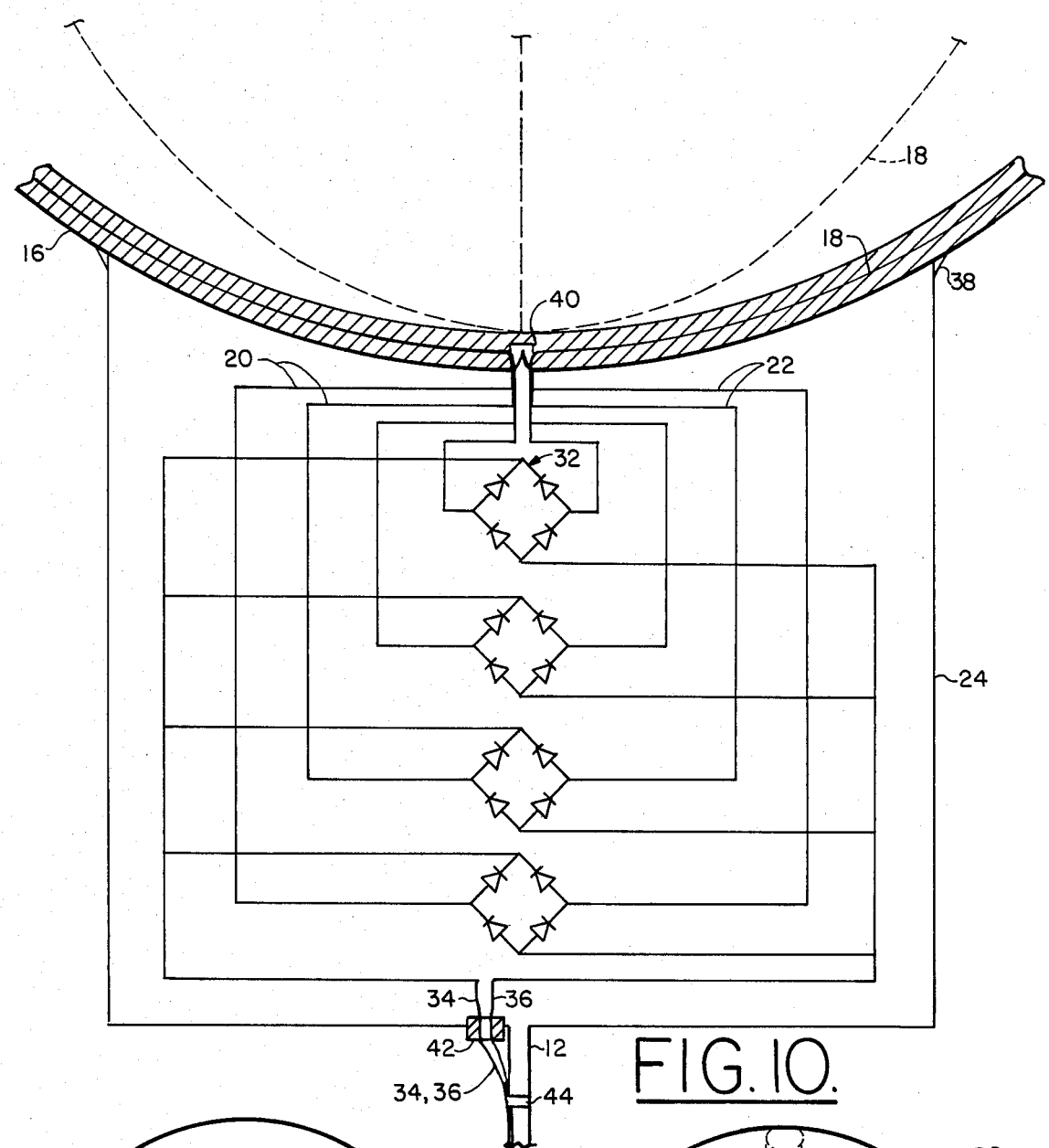
FIG. 10 is a schematic illustration of the ends of the windings connected to a rectifier device.

As illustrated in FIG. 7 the winding ends 20 and 22 are connected to a rectifier device 32 for ensuring plus and minus polarized current flow from the rectifier device on leads 34 and 36 respectively. The rectifier device 32 may include a bridge with a diode located in each leg of the bridge for ensuring the desired one-way current flow. As illustrated in FIG. 10, the rectifier device 32 is located within the junction box 24 at the bottom of the spherical buoy 16. The junction box 24 may be sealed to the bottom of the spherical buoy by any suitable means such as epoxy 38 along their juncture. The ends 20 and 22 of the windings 16 exit the bottom of the sphere 18 through an opening 40 for connection to the rectifier device 32 within the junction box 24. The lead lines 34 and 36 from the rectifier device 32 exit the bottom of the junction box 24 via a watertight feedthrough connector 42, after which the lead lines 34 and 36 may be attached to the cable 12 by any suitable means such as tape 44. As illustrated in FIGS. 1, 2, and 3 the lead lines 34 and 36 may follow down the cable 12 to the bottom anchor thence to an energy storage device (not shown) for powering oceanographic equipment (not shown).

Figure 11:
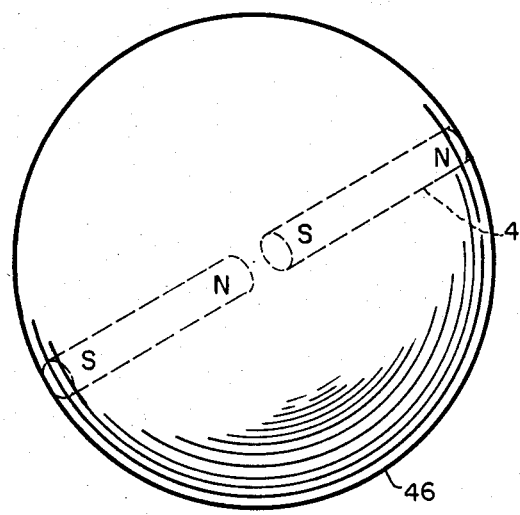
FIG. 11 is an isometric illustration of a ball with one magnet embedded therein.
Figure 12:
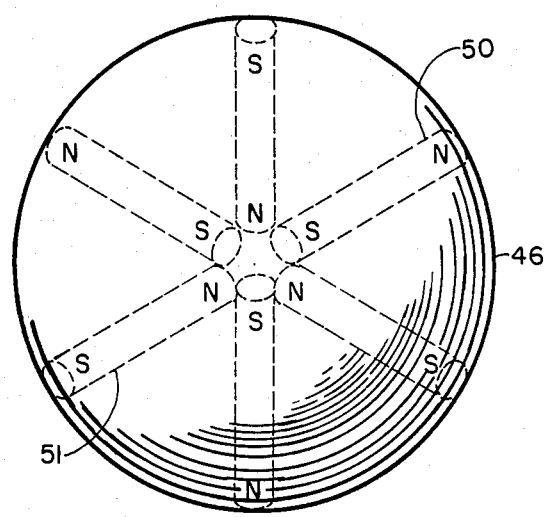
FIG. 12 is a ball with a plurality of magnets embedded therein in an orthogonal relationship.

As illustrated in FIGS. 1 through 5, there is magnetized means which is located within the spherical buoy 16 for rolling back and forth therein. As illustrated in FIGS. 11 and 12, it is preferable that the magnetized means be a ball which has a magnet or magnets embedded therein. One embodiment is illustrated in FIG. 11 wherein a bar magnet 48 extends across a diametrical axis of the ball 46. In FIG. 12, a preferred embodiment is illustrated wherein magnets are directed along three diametrical axes which are all perpendicular with respect to one another. Each axis has a pair of magnets 50 and 51 which are aligned north to south and north to south in the same direction therealong. It is preferable that the ball 46 be constructed of plastic and that the magnets of either embodiment be embedded therein.

Figure 8:
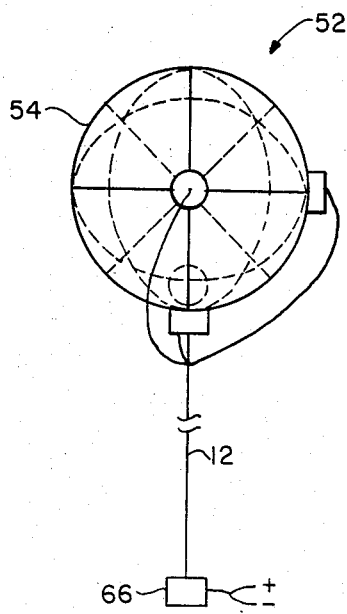
FIG. 8 is a side view of another embodiment of the wave powered buoy generator.
Figure 9:
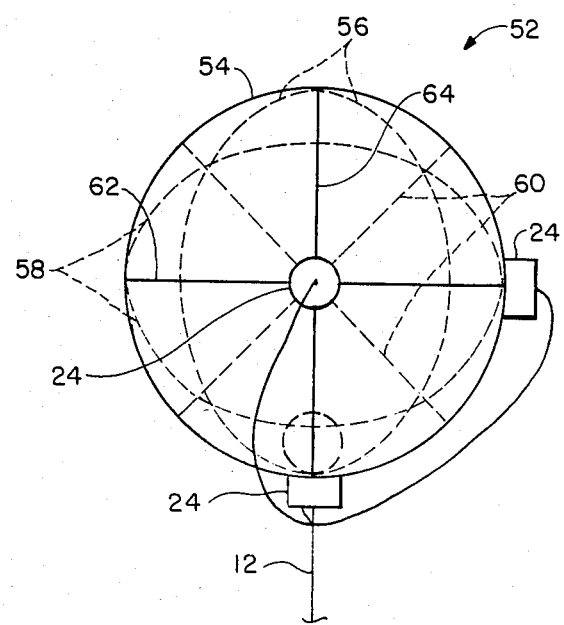
FIG. 9 is an enlarged view of the wave powered buoy generator of FIG. 8.

The preferred embodiment 52 of the wave powered buoy generator is illustrated in FIGS. 8 and 9 wherein the generator includes a hollow spherical buoy 54 which is similar to the spherical buoy 16 of the first described embodiment. The spherical buoy 54 has a top and bottom and three pairs of poles, the first pair of poles being aligned vertically, the second pair being aligned horizontally, and the third pair being aligned horizontally in an orthogonal relationship to the second pair of poles. The embodiment of FIGS. 8 and 9 differs from the first embodiment in that first, second, and third sets of windings 56, 58, and 60 extend along great circles of the sphere which are common to the first, second, and third pairs of poles respectively. The windings of each set cross at one of its respective poles and the ends of the windings are located at the opposite pole. The three opposite poles have junction boxes 24 attached thereat similar to the first embodiment. It is preferred that the windings be embedded in the sphere, exit the sphere, and be connected to a rectifier device in the junction boxes 24 in the same manner as described for the first embodiment. The spherical buoy 54 is split additionally along circumferences 62 and 64 through its poles so that eight equally divided quadrants are formed. Each quadrant of the sphere is provided with means for connecting the windings similar to that as described for the first embodiment. The junction boxes 24 are epoxied in place and can be removed simply by grinding the epoxy from their juncture lines. The embodiment of FIGS. 8 and 9 preferably utilizes the magnetized ball illustrated in FIG. 12 which has magnets along three diametrical axes. With such an arrangement the cutting that takes place between the windings and the flux lines of the magnetized ball are optimized so as to produce a maximum current output due to wave motion.

In both of the embodiments only a few windings were illustrated for explanatory purposes. It should be understood that in an actual working embodiment hundreds of windings may be placed within a sphere in order to optimize the electrical current output. Further, the magnetized ball 46 may be increased in size over that shown so as to utilize larger magnets and therefore increase the intensity of the magnetic forces.

OPERATION OF THE INVENTION

In the operation of the embodiment illustrated in FIGS. 1 through 3 the spherical buoy 16 is opened, as shown in FIG. 5, to place the magnetized ball 46 therein. The hemispheres are then assembled so that the connectors 28 and 30 join the windings, after which the sphere is sealed along its parting line 26 by any suitable means such as epoxy. The spherical buoy 16 is then tethered to an anchor 66 at the bottom of the ocean by the cable 12. The output lines 34 and 36 extend down the cable 12 to the anchor 66 after which they may extend to an energy storage device (not shown) which in turn powers an oceanographic device (not shown). If it should become desirable to disassemble the buoy the operator simply grinds off the epoxy joining the hemispheres to open the buoy and grinds off the epoxy at the juncture of the junction box with the sphere 16 to remove it.

It should be understood that the invention need not take the form of a buoy, but could be a spherical object which could be used on land and moved by wind action to generate electricity. Further, the generator could be cylindrical shaped rather than being spherical, and the magnetized device could also be cylindrical for rolling back and forth therein. In some ocean applications it may be desirable to make the generator free-floating and not anchored to the bottom of the ocean.

Obviously, many other modifications and variations of the present invention are possible in the light of the above teachings. It is therefore to be understood that within the scope of the appended claims the invention may be practiced otherwise than as specifically described.

What is claimed is:
1. A buoy generator comprising:
a hollow buoy having inner and outer surfaces;

at least one winding mounted to the buoy parallel to its surfaces, the winding having a pair of ends;

magnetized means freely disposed in all dimensions within the hollow buoy for unrestricted rolling on the inside surface of the hollow buoy whenever the hollow buoy has any rolling movement; and means connected to the winding ends for rectifying current flow therefrom, whereby, upon mooring the buoy in water, the flux lines of the magnetized roller means cut the winding when there is water motion and electrical current is provided by the winding through the rectifying means.

2. A buoy generator as claimed in claim 1 including:
the buoy being spherical;
the magnetized means being a ball with at least one magnet located therein.

3. A buoy generator as claimed in claim 2 including:
the spherical buoy having a top and a bottom;
a plurality of windings mounted to the buoy parallel to its surfaces, each winding having a pair of ends;
said windings lying within vertical planes which include the vertical axis of the spherical buoy; and
the windings crossing at the top of the spherical buoy and the ends of the windings being located at the bottom of the spherical buoy.

4. A buoy generator as claimed in claim 3 including:
a junction box mounted on the bottom exterior surface of the spherical buoy;
the rectifying means being located in the junction box; and
the ends of the windings being connected to the rectifying means.

5. A buoy generator as claimed in claim 4 including:
the spherical buoy being constructed of plastic and the windings being imbedded in the wall of the spherical buoy;
the spherical buoy being split into hemispheres between its top and bottom; and
each hemisphere having means for connecting the windings when the hemispheres are placed together to form the spherical buoy.

6. A buoy generator as claimed in claim 4 including:
the magnetized means being a ball with bar magnets aligned along the vertical axis and along each of a pair of orthogonal horizontal axes of the spherical buoy; and
each axis having a pair of magnets aligned north to south and north to south in the same direction.

7. A buoy generator as claimed in claim 6 including:
the spherical buoy being constructed of plastic and the windings being imbedded in the wall of the spherical buoy;
the spherical buoy being split into hemispheres between its top and bottom; and
each hemisphere having means for connecting the windings when the hemispheres are placed together to form the spherical buoy.

8. A buoy generator as claimed in claim 2 including:
the spherical buoy having a top and a bottom and three pairs of poles, the first pair of poles being aligned vertically, the second pair being aligned horizontally, and the third pair being aligned horizontally in an orthongal relationship to said second pair;
a plurality of windings mounted to the buoy parallel to its surfaces, each winding having a pair of ends;

first, second, and third sets of windings along great circles which are common to the first, second, and third pairs of poles respectively; and the windings of each set of windings crossing at one of its poles and the ends of the windings being located at the other pole.

9. A buoy generator as claimed in claim 8 including:
a junction box mounted on the buoy at each pole where the ends of the windings are located;
the rectifying means being located in each junction box; and
the ends of the windings being connected to the rectifying means.

10. A buoy generator as claimed in claim 9 including:
the spherical buoy being constructed of plastic and the windings being imbedded in the wall of the spherical buoy;
the spherical buoy being split through the poles into eight equally divided quadrants; and
each quadrant having means for connecting the windings when the quadrants are placed together to form the spherical buoy.

11. A buoy generator as claimed in claim 9 including:
the magnetized means being a ball with bar magnets aligned along the vertical axis and along each of a pair of orthogonal horizontal axes of the spherical buoy; and
each axis having a pair of magnets aligned north to south and north to south in the same direction.

12. A buoy generator as claimed in claim 11 including:
the spherical buoy being constructed of plastic and the windings being imbedded in the wall of the spherical buoy;
the spherical buoy being split through the poles into eight equally divided quadrants; and
each quadrant having means for connecting the windings when the quadrants are placed together to form the spherical buoy.

13. A combination comprising:
a hollow sphere which has inner and outer surfaces;
at least one winding mounted to one of the surfaces of the hollow sphere with the winding extending parallel to said surface;
a spherical ball freely disposed in all dimensions within the hollow sphere so as to be capable of unrestricted rolling around on the inner surface of the hollow sphere when the hollow sphere is moved; and
said spherical ball being magnetized with north and south poles,
whereby when the ball rolls around in the hollow sphere, the flux lines of the ball are capable of cutting said winding and inducing a current therein.

14. A combination as claimed in claim 13 including:
the winding having a pair of ends; and
means connected to the winding ends for rectifying current flow therefrom.

15. A combination as claimed in claim 14 including:
the winding being embedded in the wall of the hollow sphere between the inside and outside surfaces thereof;
the ends of the winding extending into the ambient space outside said hollow sphere.

16. A combination as claimed in claim 15 including:
a plurality of windings, each winding lying along a respective circle of the hollow sphere;

the hollow sphere having top and bottom poles; and
the windings crossing at the top pole and the ends of the windings extending from the bottom pole into said ambient space.

17. A combination as claimed in claim 16 including:
the hollow sphere being a buoy;
a junction box mounted on the bottom exterior surface of the spherical buoy;
the rectifying means being located in the junction box;
the ends of the windings being connected to the rectifying means; and
a tether connected to the junction box.

18. A combination as claimed in claim 17 including:
the spherical buoy being split; and
the spherical buoy having means located at the split for electrically joining the windings.

* * * * *